US008781693B2

(12) United States Patent
Woodcock

(10) Patent No.: US 8,781,693 B2
(45) Date of Patent: Jul. 15, 2014

(54) METHOD FOR AUTOMATIC LOCATION IDENTIFICATION OF ELECTRONIC DEVICES ON AGRICULTURAL IMPLEMENTS

(75) Inventor: Anthony Ryan Woodcock, Ames, IA (US)

(73) Assignee: AG Leader Technology, Ames, IA (US)

( * ) Notice: Subject to any disclaimer, the term of this patent is extended or adjusted under 35 U.S.C. 154(b) by 270 days.

(21) Appl. No.: 13/413,081

(22) Filed: Mar. 6, 2012

(65) Prior Publication Data

US 2013/0238200 A1 Sep. 12, 2013

(51) Int. Cl.
*G06F 7/70* (2006.01)

(52) U.S. Cl.
USPC .................................................. 701/50

(58) Field of Classification Search
None
See application file for complete search history.

(56) References Cited

U.S. PATENT DOCUMENTS

| 5,635,911 | A | 6/1997 | Landers et al. |
| 5,809,440 | A | 9/1998 | Beck et al. |
| 6,907,331 | B2 * | 6/2005 | Paquet ............................ 701/36 |
| 2009/0070131 | A1 * | 3/2009 | Chen ................................. 705/1 |
| 2009/0312919 | A1 * | 12/2009 | Foster et al. .................... 701/50 |

* cited by examiner

*Primary Examiner* — Thomas Tarcza
*Assistant Examiner* — Adam Alharbi
(74) *Attorney, Agent, or Firm* — McKee, Voorhees & Sease, P.L.C.

(57) ABSTRACT

A system for performing agricultural operations includes a plurality of electronic modules for use on an agricultural machine, the plurality of electronic modules configured for controlling agricultural operations associated with the agricultural machine, at least one shared data bus operatively connected to each of the plurality of electronic modules, wherein each of the plurality of electronic modules being configured to monitor the at least one shared data bus and determine an unused location for itself and claim the location, wherein the system uses the location of each of the plurality of electronic modules in controlling the agricultural operations associated with the agricultural machine. A method provides for automatic assignment of a physical (or logical) address to each of a plurality of devices mounted on either a vehicle or implement used for an agricultural operation.

20 Claims, 4 Drawing Sheets

METHOD FOR AUTOMATIC LOCATION IDENTIFICATION OF ELECTRONIC DEVICES ON AGRICULTURAL IMPLEMENTS

FIELD OF THE INVENTION

The present invention relates to electronic control systems associated with agricultural machines such as agricultural implements and/or agricultural vehicles. In particular, the present invention relates to electronic control systems on agricultural machines which include a plurality of different electronic modules which need to have unique addresses.

BACKGROUND OF THE INVENTION

The nature of many agricultural implements (especially for grain crops) is to have a series of devices (discs, shovels, row units, spray nozzles, etc.) that are spanned across a bar or boom that runs perpendicular to the axis of motion of the tractor or other vehicle. When the implement is used, the devices run at parallel intervals (which may or may not be evenly spaced) in relation to the direction of forward motion of the vehicle. If the devices are "active" (driven or controlled by external means to perform a function), they are usually controlled by one or more of the following methods: mechanical, hydraulic, pneumatic, or electronic. An example of an active device would be a planter row unit that dispenses seed from a seed storage container into a planted row in the ground. Planter row units may be controlled by one or a combination of the previously listed methods. Active-electromechanical devices are active devices that can be controlled electronically.

The devices on agricultural implements and vehicles may also be "passive", which means they are sensors that detect one or more field conditions or implement/vehicle conditions. An example of a passive sensor is a soil probe which detects the pH level of the soil.

In the field of precision agriculture, passive devices are typically used to spatially record varying field or crop conditions. Active-electromechanical devices are used to variably apply some product (seed, fertilizer, or chemical) or perform some other function according to the device's location within the field. Spatial control of active-electromechanical devices is based on either currently-sensed data or prescriptions, which associate spatial locations within the field with a particular rate (or other variable-level of device function). Prescriptions are often, but not always, based on previously sensed field conditions. A Global Positioning System (GPS) receiver is typically used to determine the implement/vehicle location within the field, which is used for the spatial data logging and control.

If the devices are controlled and/or communicate electronically, they may be connected to a common data bus that allows the devices to receive control and configuration data and transmit status and configuration data (this would typically be implemented with a Controller Area Network or CAN bus). Any device that is connected to the common data bus may transmit data to one or more devices connected to the bus and may receive data from any device connected to the bus. When an implement or vehicle is configured with multiple devices spanned across a bar or boom that perform some function, it is important that each device has a unique positional address so that its physical positioning can be determined by other modules in the system. Each electronic module also needs a unique address so that the other electronic modules can individually communicate with it. There are several methods for assigning unique positional addresses to multiple devices that are listed below:

1. Configurable jumpers or switches on the device to assign the address.
2. Devices must be plugged in one-at-a-time so either the device itself or some other controlling device can determine what address needs to be used and assign it.
3. Devices are wired in-order and communicate with an external controlling device (master module) when they receive an "assign address" signal such as disclosed in U.S. Pat. Nos. 5,809,440 and 5,635,911.
4. Configured address signal pins in the device connectors along the implement wiring harness that determine address based on where the device is connected in the harness.

The problem with these methods is that they require special action on the device (from either an operator/technician or an external device) or a specially-designed wiring harness to assign an address so it functions properly. The method described in this invention assigns device addresses without the need for any special action. Each module is responsible for monitoring the shared data bus and assigning its own address when it receives the address assignment signal from the adjacent module.

Automatic address identification is important because devices and the wiring harnesses that connect them can be manufactured identically with no special process or programming needed to assign the device's address. Also, it means that any of the identical devices can be placed at any of the device positions without any need to reprogram or change the device address.

In some agricultural operations like liquid application, the use of multiple tiers of control has several advantages including larger range of control and faster response times to reach different rates. Tiers are items, like sprayer booms, that are located at nearly the same physical position and apply to the same physical area. If a system of active or passive devices on an agricultural vehicle or implement has more than one tier, the tier becomes part of the physical address of each device and must also be settable and determinable for each device. The method described in the present invention uses a tier input signal as part of the physical address to allow for two tiers to be used in a system.

SUMMARY OF THE INVENTION

Therefore, it is a primary object, feature, or advantage of the present invention to improve over the state of the art.

It is a further object, feature, or advantage of the present invention to provide for the automatic assignment of an address to indicate the physical or logical location of an electronic device on an agricultural vehicle or implement.

It is a still further object, feature, or advantage of the present invention to provide for the use of multiple tiers.

One or more of these and/or other objects, features, or advantages of the present invention will become apparent to those skilled in the art upon reference to the following specification, drawings, and claims. No single embodiment of the invention need meet each and every object, feature, or advantage provided herein and the present invention is not to be limited to or by these objects, features and/or advantages.

The present invention is a method for automatic location (or index) identification of electronic devices used for control and/or data collection on agricultural implements and vehicles. In particular, the method uses a serial control line passed through each device and one or more shared data buses between devices to allow each device to automatically determine its unique physical or logical address. This unique address is used by other devices to have individual communication with a single device using the shared data bus that connects to the devices.

The present invention intends to overcome the difficulties encountered heretofore in the assignment of electronic device addresses to indicate physical or logical location on an agricultural vehicle or implement. To that end, a design is presented that uses address control lines in each device and a communication process on one or more shared data buses so each device can determine its own physical or logical location. This design automatically assigns a device address without requiring any special action prior to installation or requiring interaction with an external device that assigns the device address.

The present invention also describes the use of a tier input signal included in the determination of physical device address that can be used to further differentiate modules in the system hierarchy for providing a higher resolution of system control with the use of two tiers.

According to one aspect of the present invention, a collection of electronic modules of identical or different types with the purpose of performing an agricultural operation is provided. The agricultural operation may include dispensing a product, sensing product flow into and out of the system, sensing field conditions, performing some operation on the plants in the field, or performing some operation on the soil in the field. The physical or relative location of the electronic modules in the collection is necessary for proper control or sensing or data collection. Each of the collection of modules is connected to one or more shared data buses such that the network of modules and data buses contains the entire collection of modules and there is no physical separation of any module. Each module is responsible for determining its own physical or logical location by monitoring one or more shared data buses to determine an unused location and then transmitting its determined location on the shared data buses. Each module has an input line that enables the module to claim a physical location when the line is asserted. Each module has an output line connected to the input line of the next module in physical or logical order. The collection of modules may exist on either an agricultural implement or vehicle. Each module may further include an input for determining the tier of the module where the input is set by using a predetermined electrical connection in the connector that connects the module to the network of modules.

According to another aspect of the present invention, a system for performing agricultural operations is provided. The system may include a plurality of electronic modules for use on an agricultural machine, the plurality of electronic modules configured for controlling agricultural operations associated with the agricultural machine, at least one shared data bus operatively connected to each of the plurality of electronic modules. Each of the plurality of electronic modules is configured to monitor the at least one shared data bus and determine an unused location for itself and claim the location. The system uses each of the plurality of electronic modules in controlling the agricultural operations associated with the agricultural machine.

According to another aspect of the present invention, a method of controlling agricultural operations of a plurality of electronic modules on an agricultural machine is provided. The method includes providing a system comprising (a) the plurality of electronic modules for use on an agricultural machine, the plurality of electronic modules configured for controlling agricultural operations associated with the agricultural machine, (b) at least one shared data bus operatively connected to each of the plurality of electronic modules. The method further includes monitoring by each of the plurality of electronic modules of the at least one shared data bus, determining by each of the plurality of electronic modules an unused location, claiming by each of the plurality of electronic modules of the unused location, and using the location of each of the plurality of electronic modules in controlling the agricultural operations associated with the agricultural machine;

According to another aspect of the present invention, an improvement to an agricultural machine is provided. The improvement includes a plurality of electronic modules for use on the agricultural machine, the plurality of electronic modules configured for controlling agricultural operations associated with the agricultural machine, at least one shared data bus operatively connected to each of the plurality of electronic modules. Each of the plurality of electronic modules being configured to monitor the at least one shared data bus and determine an unused location for itself and claim the location. The agricultural machine uses the location of each of the plurality of electronic modules in controlling the agricultural operations associated with the agricultural machine.

According to another aspect of the present invention, the present invention provides for automatic assignment of a physical (or logical) address to each of a plurality of devices mounted on either a vehicle or implement used for an agricultural operation. The method uses an address control input and output on each device and a communication strategy on a common data bus to determine the physical (or logical) ordering of the modules.

DETAILED DESCRIPTION OF THE PREFERRED EMBODIMENTS

Figure 1:
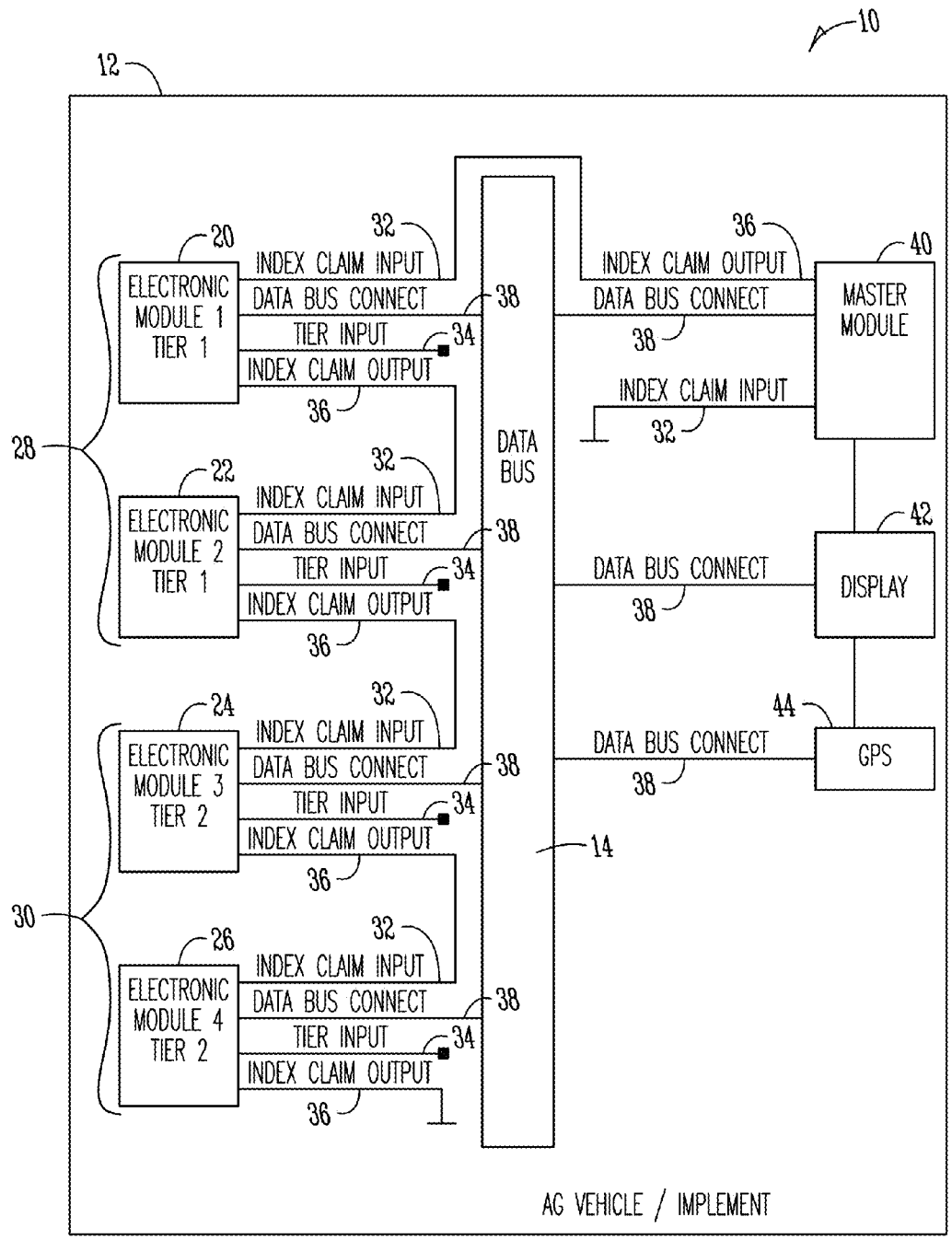
FIG. 1 is a block diagram illustrating one embodiment of the present invention.

FIG. 1 is a block diagram illustrating one embodiment of the present invention. In FIG. 1, a system 10 is shown which includes an agricultural machine 12 which may be an agricultural vehicle or implement. Associated with the agricultural machine 12 is a data bus 14. A plurality of first tier electronic modules 28 is shown and a plurality of second tier electronic modules 30 are shown. The first tier 28 includes a first electronic module 20 and a second electronic module 22. The second tier 30 includes a third electronic module 24 and a fourth electronic module 26. Each of the electronic modules 20, 22, 24, 26 is electrically connected to the shared data bus 14 by its data bus connect input/output 38.

Each of the electronic modules 20, 22, 24, 26 each has index claim input 32, a tier input 34 and an index claim output 36. A master module is also electrically connected to the data bus 14 and has an index claim input 32 and an index claim output 36. A Global Positioning System (GPS) receiver 44 is electrically connected to the display 42 or data bus 14. A display 42 is also operatively connected to the master module 40.

Figure 2:
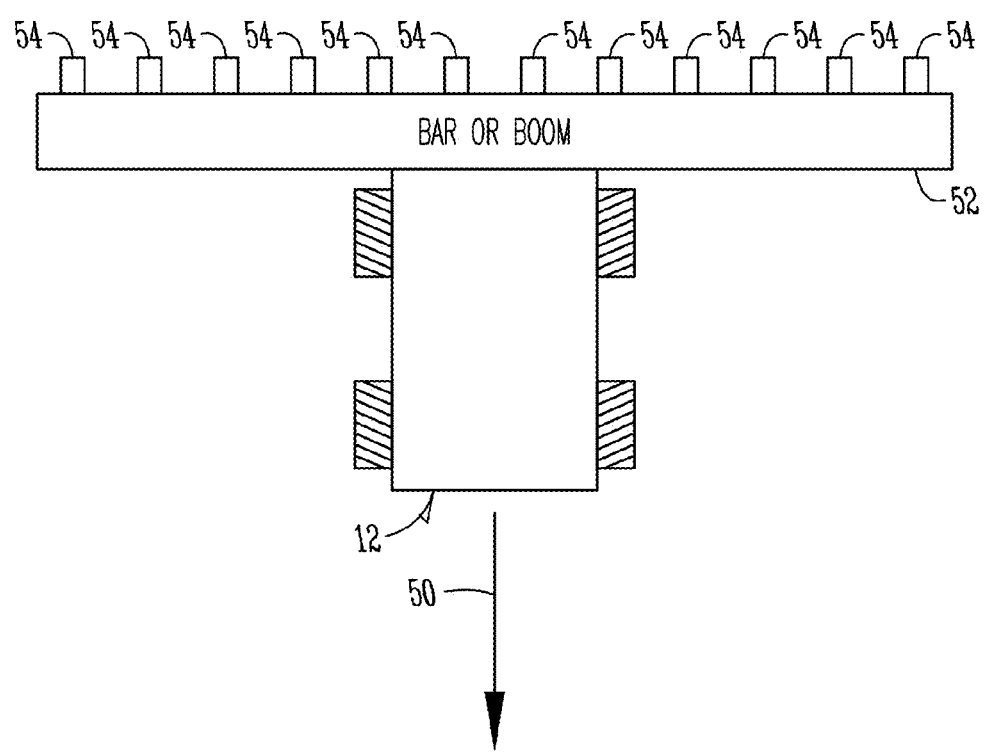
FIG. 2 illustrates one example of agricultural equipment or an agricultural vehicle which includes a liquid application control system.

FIG. 2 illustrates an agricultural machine 12 with a direction of travel 50 shown. A bar or boom 52 forms a part of the agricultural machine 12. The agricultural machine 12 may be towable or self-propelled. The agricultural machine may have a bar or boom 52. Mounted along the bar or boom 52 may be a plurality of devices 54 for performing agricultural operations. For example, where the agricultural machine is a sprayer the devices 54 may include nozzles for spraying. The electronic modules are electrically connected to the devices 54 to control the devices 54.

Figure 3:
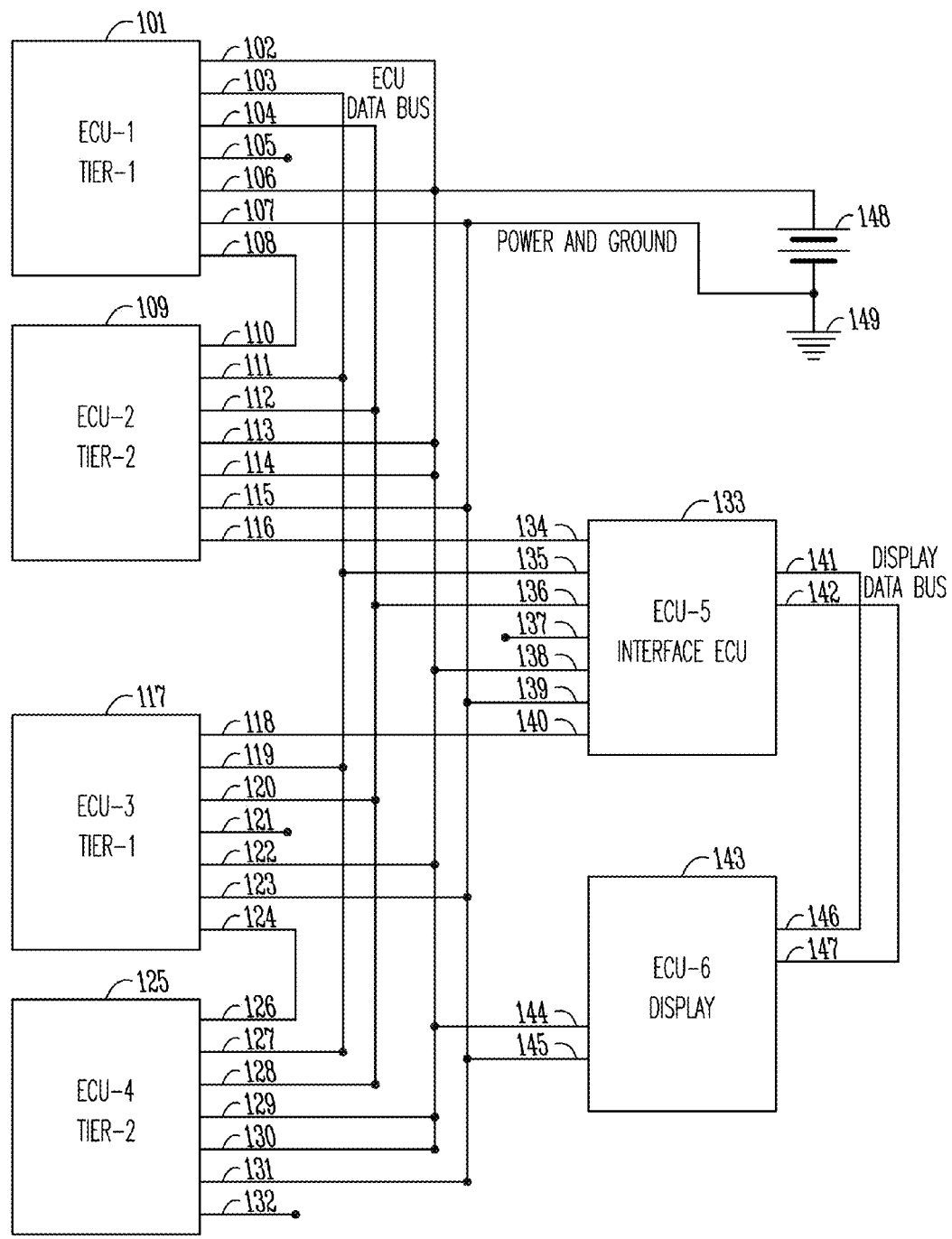
FIG. 3 is a block diagram for a liquid application control system that illustrates automatic logical address assignment in accordance with the present invention. It includes a module for liquid flow rate control and four modules for section on/off control that comprise two tiers.

FIG. 3 is a block diagram of a liquid application control system in accordance with the present invention. In the described embodiments, the data buses are Controller Area Network, or CAN, implementing the following specifications: CAN 2.0B, ISO11783-1, ISO11783-2, ISO11783-3, and ISO11783-5. Of course, other types of data buses may be used as may be appropriate in a particular implementation. The display 42, 143, 207 is a precision farming field computer that configures the system's electronic control units (ECUs) and records and displays the data that they provide. A Global Positioning System (GPS) receiver may be attached to the field computer and communicate using either an RS-232C serial connection or a CAN bus connection. The GPS receiver provides a real-time spatial position of the application system that is used to spatially log the data from the ECUs.

Each ECU has an electrical connector that connects the device to electrical power and a common data bus. Each ECU has a tier input line that, if applicable, determines the tier to which the module should be assigned. Each ECU also has an input line for receiving the signal to claim a physical address as well as an output line for transmitting the signal to claim a physical address. The physical (or logical) address refers to a position number, or physical location relative to other ECUs in the system. For the application system, numbering starts at 0 and counts up going from left-to-right across the machine, looking in the direction of forward motion. Each ECU has a unique data bus address and a unique physical address. The data bus address is not indicative of physical position and is used for individually addressing an ECU or determining the source of a message packet on the common data bus. In the described embodiments of the invention, the data bus address is determined according to the CAN names of the ECUs in the system as described in ISO11783-5. Once each ECU has a unique data bus address, it can communicate on the common data bus. Data transmitted by a device on the common data bus includes the data bus address of the transmitting device so other devices can determine which device sent the data. Also, data transmitted by a device on the data bus may also include a destination address, which is the address of the device that should receive the data.

During the physical address assignment process, which will be called "index claiming", the physical address (or index) of an ECU is associated with its data bus address using a broadcast message packet that is received by all ECUs on the common data bus.

This method has the following advantages:
There is no need for special address switches or jumpers on the device that have to be set before it will function properly.
There is no need for special programming of the device to assign an address.
There is no need for a special installation sequence or procedure for the devices to properly assign an address.
There is no need for an external device to assign the address.
There is no need for a specially built wiring harness where the address of the device is assigned by address pins in the connectors.

In the first embodiment shown in FIG. 3, the liquid control system consists of a liquid control master module 133 and four section control modules 101, 109, 117, and 125. The four section control modules represent two tiers. Each module is connected to electrical power 148 and electrical ground 149. For section control module 101, the electrical power connection is input line 106 and the electrical ground connection is input line 107. Each module is also connected to the common data bus (ECU DATA BUS), which is a CAN bus. For section control module 101, the common data bus is connected to input/output lines 103 (CAN High) and 104 (CAN Low).

Each module has an index claim input. These are input lines 102, 110, 118, 126, and 134. In this embodiment of the invention, if the voltage on the index claim input is greater than half the electrical power input voltage, the input is considered to be logic high. Likewise, if the input voltage is less than half the electrical power input voltage, the input is considered to be logic low. Each module also has an index claim output. These are output lines 108, 116, 124, 132, and 140. In this embodiment of the invention, if the voltage on the index claim output is greater than half the electrical power input voltage, the output is considered to be logic high. Otherwise, the output is considered to be logic low.

The tier of each module is determined by the tier input lines 105, 113, 121, 129, and 137. If the tier input is not connected or is connected to electrical ground, the module will set to tier 1. If the tier input is connected to electrical power, the module will set to tier 2. The display 143 and liquid master module 133, communicate on the DISPLAY DATA BUS, which is also a CAN bus.

When electrical power is applied to the system, all modules will be in an uninitialized state, which means they do not have a CAN address or a physical address. Each module will first claim a CAN address according to the procedure in ISO11783-5. Next, each module will set its index claim output line to logic low. Once the liquid master module 133 has successfully claimed a CAN address, it will wait five seconds and then send out a broadcast message packet on the data bus, called index claim-master initiate, which signals to all modules to prepare for index claiming.

Two seconds after sending out the index claim-master initiate message packet, the liquid master module 133 will send out a broadcast message packet on the data bus, called index claim-local initiate, which signals to all modules on the data bus to begin index claiming. Each module will begin testing its index claim input line to determine if it is the next module that should claim an index and broadcast an index claim message packet on the data bus. Each module will also begin listening to the data bus for index claim message packets from other modules and will build a list of indexes used for modules of its type. For each module, if the index claim input line is logic high, the module will claim the next index. The index claim input 102 on swath control module 101 (ECU-1) is connected to electrical power. This creates a logic high on the input and the module will claim INDEX0-TIER1 since no other modules have claimed an index and the tier input is not connected. Claiming an index and tier consists of sending out a broadcast message on the data bus, called index claim, that indicates the index and tier being claimed. Now that it has claimed an index, swath control module 101 (ECU-1) will set its index claim output 108 to logic high to signal the next module that it should index claim. Swath control module 109 (ECU-2) detects logic high on its index claim input 110. It determines that its tier input 113 is connected to electrical power, so its tier will be 2. Since it has only received an index claim for INDEX0-TIER1, it will claim INDEX0-TIER2. Now that swath control module 109 (ECU-2) has claimed an index, it will set its index claim output 116 to logic high to signal the next module that it should index claim. The liquid control master module 133 detects logic high on its index claim input 134. It determines that its tier input 137 is not connected so its tier will be 1. Since it is a different module type, it will use a different set of indexes than the swath control modules. The module type can be determined with the CAN name as defined in ISO11783-5. Therefore, the physical indexing is only needed to differentiate physical location of modules of the same type. The liquid control master module 133 claims INDEX0-TIER1. Once it claims its index, the liquid control master module 133 sets its index claim output to logic high. The swath control module 117 detects logic high on its index claim input 118. It determines that its tier input 121 is not connected so its tier will be 1. It has already received an index claim from a swath control module for INDEX0-TIER1 so it must claim INDEX1-TIER1. After claiming its index, it sets its index claim output to logic high. Swath control module 125 then detects logic high on its index claim input 126. It determines that its tier input 129 is connected to electrical power, so its tier will be 2. Since it has already received an index claim from a swath control module for INDEX0-TIER 2, it must claim INDEX1-TIER2. After claiming its index, it sets its index claim output to logic high.

At this point, every module has claimed an index and its physical location and tier can be determined. The liquid control master module 133 sets a two second timer after receiving the first index claim message packet and resets it after receiving each subsequent index claim message packet. When the timer expires, it assumes that index claiming is complete. Since it has listened and recorded each index claim message packet, it now knows the physical arrangement of all modules left-to-right as well as the tier arrangement. It uses this information to send a system description to the display 143 as a series of message packets on the DISPLAY DATA BUS. The display 143 will use the system description to create and send command message packets back to the liquid control master module 133 for applying a liquid product at a certain rate over a specified area. The liquid control master module 133 uses these command message packets and its stored system description to control its own connected components and generate commands to send to the swath control modules for control of their components that performs the action commanded by the display 143.

Figure 4:
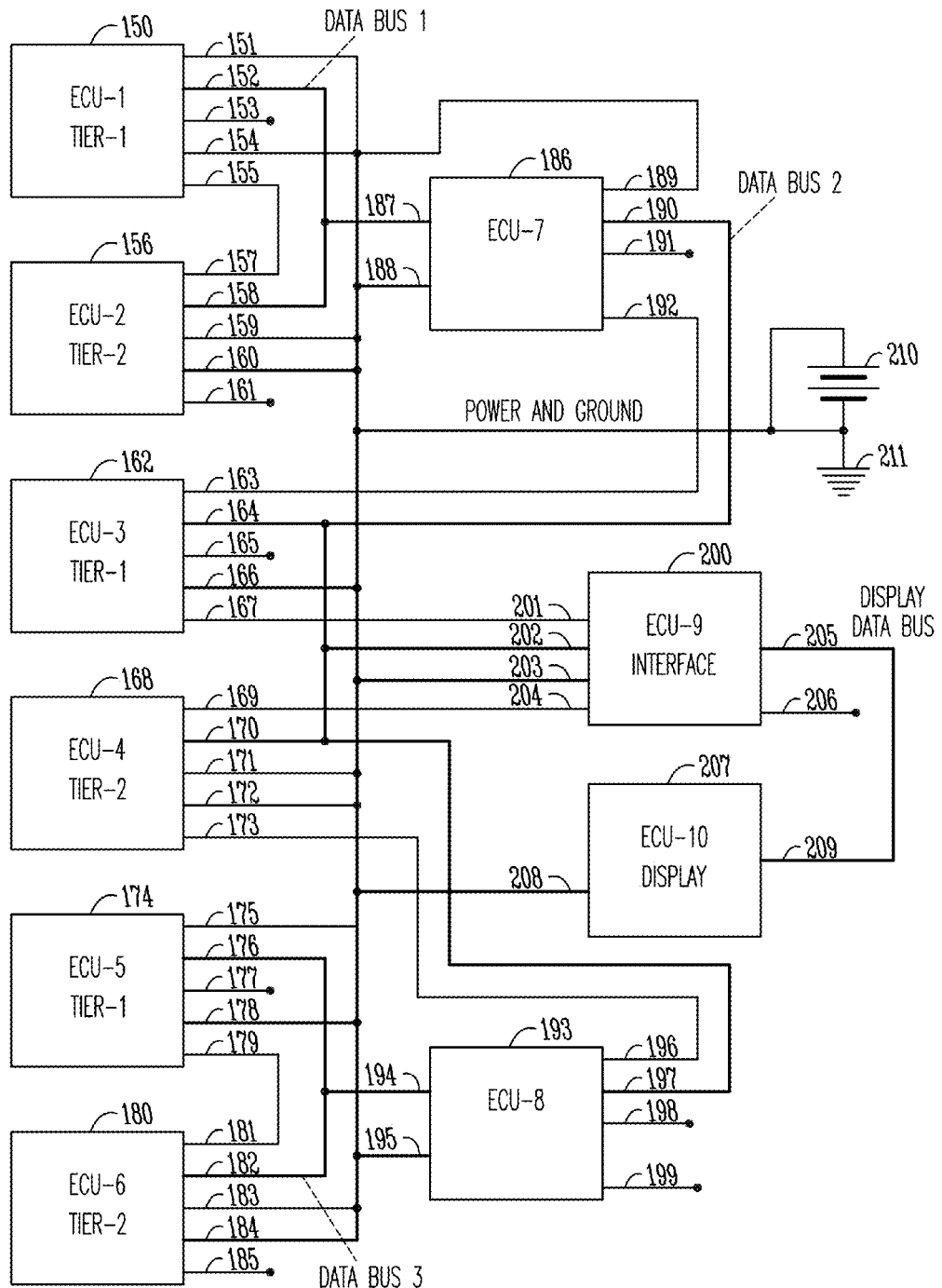
FIG. 4 is a block diagram for an advanced liquid application control system that illustrates automatic logical address assignment in accordance with the present invention. It includes three modules for liquid flow rate and six modules for section on/off control that comprise two tiers.

In the second embodiment shown in FIG. 4, the liquid control system consists of a liquid control master module 200 (ECU-9) and two liquid control slave modules 186 (ECU-7) and 193 (ECU-8). The system also includes six section control modules 150 (ECU-1), 156 (ECU-2), 162 (ECU-3), 168 (ECU-4), 174 (ECU-5), and 180 (ECU-6). The six section control modules represent two tiers. Each module is connected to electrical power 210 and electrical ground 211. For simplicity, the electrical power and ground is drawn as a single POWER AND GROUND bus. For section control module 150, the POWER AND GROUND bus connection is input element 154. There are four data buses in the system, which are implemented as CAN buses: DATA BUS 1, DATA BUS 2, DATA BUS 3, and DISPLAY DATA BUS. For simplicity, the CAN High and CAN Low lines of each data bus are drawn as a single thick line. DATA BUS 1 connects bus elements 152, 158, and 187 and connects modules 150, 156, and 186. DATA BUS 2 connects bus elements 164, 170, 190, 197, and 202 and connects modules 162, 168, 186, 193, and 200. DATA BUS 3 connects bus elements 176, 182, and 194 and connects modules 174, 180, and 193. The DISPLAY DATA BUS connects bus elements 205 and 209 and connects modules 200 and 207. In this embodiment, not every module that claims an index is connected to the same data bus. The modules are set up as a hierarchy where modules at the lowest level of the hierarchy (e.g. module 150) are connected to a single data bus and modules at higher levels of the hierarchy (e.g. module 186) are connected to two data buses. The index claiming methodology now requires having modules that are connected to two data buses pass index claim message packets from one data bus to the other so all modules have access to index claiming information.

When electrical power is applied to the system, all modules will be in an uninitialized state, which means they do not have a CAN (data bus) address or a physical address. Each module will first claim a CAN address on each of the data buses that it is connected to. This is done according to the procedure specified in ISO11783-5. Next, each module will set its index claim output line to logic low. Once the liquid master module 200 has successfully claimed a CAN address, it will wait five seconds and then send out the index claim-master initiate broadcast message packet on DATA BUS 2. The liquid slave module 186 will pass the index claim-master initiate message packet through to DATA BUS 1 so that swath control modules 150 and 156 receive it. Liquid slave module 193 will pass the index claim-master initiate message packet through to DATA BUS 3 so that swath control modules 174 and 180 receive it. Now, all modules have received the index claim-master initiate message packet and are prepared for index claiming.

The liquid master module 200 waits two seconds to guarantee that all modules in the system have received the index claim-master initiate message. It then sends out the index claim-local initiate message packet on DATA BUS 2. This message signals the modules connected to DATA BUS 2 to begin the index claiming process. Unlike the index claim-master initiate message, the liquid slave modules 186 and 193 will not pass this message through to DATA BUS 1 and DATA BUS 3. The index claim input 189 on liquid slave module 186 is connected to electrical power. This creates a logic high on the input and the module can begin its index claiming process.

Since liquid slave module 186 is connected to swath control modules 150 and 156 on DATA BUS 1, before it claims its index, it sends an index claim-local initiate message packet on DATA BUS 1 to allow its subordinate modules on that data bus to claim an index before setting its index claim output to logic high and continuing the index claiming process on DATA BUS 2. This is the way index claiming with a multilevel hierarchy is completed. If a module has other subordinate modules connected to its second data bus (e.g. liquid slave modules 186 and 193), it will allow index claiming of all subordinate modules before claiming its own index and asserting its index claim output to continue index claiming for its peers. The index claim input 151 on swath control module 150 is connected to electrical power. This creates a logic high on the input and the module will claim INDEX0-TIER1 since no other swath control modules have claimed an index and the tier input 153 is not connected. The index claim message packet is sent out on DATA BUS 1 and passed through to DATA BUS 2 by liquid slave module 186. The other liquid slave module 193 receives the index claim packet and passes it through to DATA BUS 3 so it can be also be received by swath control modules 174 and 180. Like the index claim-master initiate message, index claim messages are always passed through to the data buses that comprise the module hierarchy—DATA BUS 1, DATA BUS 2, and DATA BUS 3. This way, all modules in the system receive all index claim message packets from all other modules in the system. This allows the index claiming process to happen correctly regardless of the fact that modules may not share a common data bus. Swath control module 150 will set its index claim output 155 to logic high to signal the next module that it should index claim. Swath control module 156 detects logic high on its index claim input 157. It determines that its tier input 159 is connected to electrical power, so its tier will be 2. Since it has only received a swath control module index claim for INDEX0-TIER1, it will claim INDEX0-TIER2. Liquid slave module 186 knows from the initial address claiming that two swath control modules are connected on its second data bus. When it receives the index claims from both modules 150 and 156, it knows that index claiming for its subordinate modules is complete and it can now claim its own and then assert its index claim output 192 to logic high to continue the index claiming process. It will claim INDEX0-TIER1 since no other liquid modules have claimed an index and the tier input 191 is not connected.

Swath control module 162 now detects index claim input 163 is logic high, so it can now claim an index. It knows its tier is 1 because tier input 165 is not connected. Since it has already received an INDEX0-TIER1 index claim from a swath control module, it must claim INDEX1-TIER1. After claiming its index, it sets index claim output 167 to logic high. Index claim output 167 is connected to index claim input 201 on the liquid master module 200. Now that its index claim input is logic high, it proceeds to claim an index. Its tier input 206 is not connected so its tier is 1. It has already received an INDEX0-TIER1 index claim from a liquid control module so it must claim INDEX1-TIER1. After index claiming, it asserts its index claim output 204 to logic high. Index claim output 204 is connected to index claim input 169 on swath control module 168. Its tier input 171 is connected to electrical power so its tier is 2. It has already received an INDEX0-TIER2 index claim from a swath control module, so it claims INDEX1-TIER2 and then asserts its index claim output 173 to logic high. Index claim output 173 is connected to index claim input 196 on liquid slave module 193.

Since liquid slave module 193 is connected to swath control modules 174 and 180 on DATA BUS 3, before it claims its index it sends an index claim-local initiate message packet on DATA BUS 3 to allow its subordinate modules on that data bus to claim an index before continuing the index claiming process on DATA BUS 2. The index claim input 175 on swath control module 174 is connected to electrical power. This creates a logic high on the input and the module will claim INDEX2-TIER1 since it has already received index claims INDEX0-TIER1 and INDEX1-TIER1 from other swath control modules. Swath control module 174 will set its index claim output 179 to logic high to signal the next module that it should index claim. Swath control module 180 detects logic high on its index claim input 181. It determines that its tier input 183 is connected to electrical power, so its tier will be 2. Since it has already received swath control module index claims for INDEX0-TIER2 and INDEX1-TIER2, it will claim INDEX2-TIER2. Liquid slave module 193 knows from the initial address claiming that two swath control modules are connected on its second data bus. When it receives the index claims from both modules 174 and 180, it knows that index claiming for its subordinate modules is complete and it can now claim its own and then assert its index claim output 199 to logic high to continue the index claiming process. It will claim INDEX2-TIER1 since it has already received liquid module index claims INDEX0-TIER1 and INDEX1-TIER1 tier input 198 is not connected.

The liquid master module knows from the initial address claiming that two liquid slave modules and two swath control modules are on DATA BUS 2. After it has received index claims from all of these connected modules, it determines that the index claiming process is complete. Since it has listened and recorded each index claim message packet, it now knows the physical arrangement of all modules left-to-right as well as the tier arrangement. It uses this information to send a system description to the display 207 as a series of message packets on the DISPLAY DATA BUS. The display 207 will use the system description to create and send command message packets back to the liquid control master module 200 for applying a liquid product at a certain rate over a specified area. The liquid control master module 200 uses these command message packets and its stored system description to control its own connected components and generate commands to send to the liquid slave and swath control modules for control of their components that performs the action commanded by the display 207.

Therefore, various methods and systems have been described. Although exemplary embodiments have been described in detail, it is to be understood that the present invention contemplates numerous variations, options, and alternatives. For example, the present invention contemplates that the agricultural operations may be associated with different types of agricultural vehicles or implements. The present invention contemplates that any number of electronic modules may be used with any number of different tiers. The present invention further contemplates that the shared data bus may be of any of a variety of different types. The present invention contemplates these and other variations.

What is claimed is:

1. A system for performing agricultural operations, the system comprising:
    a plurality of electronic modules for use on an agricultural machine, the plurality of electronic modules configured for controlling agricultural operations associated with the agricultural machine;
    at least one shared data bus operatively connected to each of the plurality of electronic modules, each of the plurality of electronic modules having a data bus address for communicating over the at least one shared data bus;
    wherein each of the plurality of electronic modules being configured to monitor the at least one shared data bus and automatically claim a physical address based on the physical location of the respective electronic module;
    wherein the system uses the physical location of each of the plurality of electronic modules in controlling the agricultural operations associated with the agricultural machine.

2. The system of claim 1 wherein each of the plurality of electronic modules comprise an input line that enables the electronic module to claim a physical address when the input line is asserted and an output line operatively connected to an input line of a physically or logically adjacent one of the plurality of electronic modules.

3. The system of claim 1 wherein each of the plurality of electronic modules has an input for determining a tier.

4. The system of claim 3 wherein the input is set using a predetermined electrical connection in a connector.

5. The system of claim 1 wherein the agricultural operations comprise dispensing a product.

6. The system of claim 1 wherein the agricultural operations comprise sensing product flow.

7. The system of claim 1 wherein the agricultural operations comprise sensing field conditions.

8. The system of claim 1 wherein the agricultural operations comprise operations performed on plants in a field.

9. The system of claim 1 wherein the agricultural operations comprise operations performed on soil in a field.

10. The system of claim 1 wherein the location is a physical location.

11. The system of claim 1 wherein the location is a logical location.

12. A method of controlling agricultural operations of a plurality of electronic modules on an agricultural machine, the method comprising:
providing a system comprising (a) the plurality of electronic modules for use on an agricultural machine, the plurality of electronic modules configured for controlling agricultural operations associated with the agricultural machine, (h) at least one shared data bus operatively connected to each of the plurality of electronic modules, each of the plurality of electronic modules having a data bus address for communicating over the at least one shared data bus;
monitoring by each of the plurality of electronic modules of the at least one shared data bus;
automatically determining by each of the plurality of electronic modules a physical address based on the physical location of the respective electronic module;
claiming by each of the plurality of electronic modules of the respective physical address;
using the physical location of each of the plurality of electronic modules in controlling the agricultural operations associated with the agricultural machine.

13. The method of claim 12 further comprising determining by each of the plurality of electronic modules a tier.

14. The method of claim 13 further comprising performing the agricultural operations associated with the agricultural machine.

15. The method of claim 14 wherein the agricultural operations comprise agricultural operations performed on plants in a field.

16. The method of claim 14 wherein the agricultural operations comprise agricultural operations performed on soil in a field.

17. An improvement to an agricultural machine, the improvement comprising:
a plurality of electronic modules for use on the agricultural machine, the plurality of electronic modules configured for controlling agricultural operations associated with the agricultural machine;
at least one shared data bus operatively connected to each of the plurality of electronic modules, each of the plurality of electronic modules having a data bus address for communicating over the at least one shared data bus;
wherein each of the plurality of electronic modules being configured to monitor the at least one shared data bus and automatically claim a physical address based on the physical location of the respective electronic module;
wherein the agricultural machine uses the physical location of each of the plurality of electronic modules in controlling the agricultural operations associated with the agricultural machine.

18. The system of claim 1 wherein at least some of the electronic modules claim a physical address in response to a signal received from a physically adjacent electronic module.

19. The method of claim 12 wherein a respective physical address is determined using a signal received from a physically adjacent electronic module.

20. The improvement of claim 17 wherein at least some of the electronic modules automatically claim a physical address in response to a signal received from a physically adjacent electronic module.

* * * * *

UNITED STATES PATENT AND TRADEMARK OFFICE
CERTIFICATE OF CORRECTION

| | | |
|---|---|---|
| PATENT NO. | : 8,781,693 B2 | Page 1 of 1 |
| APPLICATION NO. | : 13/413081 | |
| DATED | : July 15, 2014 | |
| INVENTOR(S) | : Woodcock | |

It is certified that error appears in the above-identified patent and that said Letters Patent is hereby corrected as shown below:

In the Claims

<u>Col. 11, Claim 12, Line 17</u>:
DELETE after machine, "(h)"
ADD after machine, --(b)--

Signed and Sealed this
Sixteenth Day of September, 2014

Michelle K. Lee
*Deputy Director of the United States Patent and Trademark Office*